US008954874B2

(12) United States Patent
Aldrey et al.

(10) Patent No.: US 8,954,874 B2
(45) Date of Patent: Feb. 10, 2015

(54) METHODS AND SYSTEMS FOR PROVIDING ONE OR MORE TOPIC SPECIFIC PORTALS

(75) Inventors: Raul I. Aldrey, Dallas, TX (US); Brian F. Roberts, Frisco, TX (US); Heath Stallings, Colleyville, TX (US); Shafiq Kassam, Lewsiville, TX (US); Enrique Ruiz-Velasco, Flower Mound, TX (US); Bradford A. Jackvony, Reading, MA (US); Don Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1688 days.

(21) Appl. No.: 11/950,928

(22) Filed: Dec. 5, 2007

(65) Prior Publication Data

US 2009/0150808 A1    Jun. 11, 2009

(51) Int. Cl.
  *G06F 3/00* (2006.01)
  *H04N 5/445* (2011.01)
  *G06F 3/01* (2006.01)
  *H04N 7/173* (2011.01)
  *H04N 21/262* (2011.01)
  *H04N 21/482* (2011.01)

(52) U.S. Cl.
  CPC ............. *H04N 5/44543* (2013.01); *G06F 3/01* (2013.01); *H04N 7/17318* (2013.01); *H04N 21/26283* (2013.01); *H04N 21/4821* (2013.01)
  USPC ........................................ 715/765; 715/764

(58) Field of Classification Search
  CPC ........................... G06F 3/01; H04N 21/26283
  USPC ................................................. 715/764, 765
  See application file for complete search history.

(56) References Cited

U.S. PATENT DOCUMENTS

| 5,585,838 | A | * | 12/1996 | Lawler et al. ................... 725/54 |
|-----------|---|---|---------|-----------------------------------------|
| 5,596,373 | A | * | 1/1997 | White et al. ................... 348/569 |
| 6,256,623 | B1 | * | 7/2001 | Jones ............................ 707/765 |
| 7,203,909 | B1 | * | 4/2007 | Horvitz et al. ................ 715/765 |
| 2003/0167471 | A1 | * | 9/2003 | Roth et al. ....................... 725/87 |
| 2004/0117831 | A1 | * | 6/2004 | Ellis et al. ........................ 725/53 |
| 2006/0036954 | A1 | * | 2/2006 | Satyadas et al. .............. 715/742 |
| 2006/0212472 | A1 | * | 9/2006 | Fox et al. ...................... 707/102 |
| 2007/0124663 | A1 | * | 5/2007 | Fischer et al. ............. 715/501.1 |
| 2008/0120651 | A1 | * | 5/2008 | Choi ................................ 725/46 |
| 2008/0313229 | A1 | * | 12/2008 | Taswell ..................... 707/104.1 |
| 2009/0007179 | A1 | * | 1/2009 | Angiolillo et al. .............. 725/44 |
| 2010/0153986 | A1 | * | 6/2010 | Ellis ............................... 725/28 |

OTHER PUBLICATIONS

"http://dsc.discover.com/fansiteds/mythbusters/episode/episode.html", first published Apr. 2004, pp. 1-4.*

* cited by examiner

*Primary Examiner* — William Bashore
*Assistant Examiner* — Gregory A Distefano

(57) ABSTRACT

A methods and systems are provided for presenting one or more topic specific portals. A portal may present various content relating to a common topic. The content may be episodes of a television show, movies, products, games, songs, images, and general information about the topic. The topic may be the television show, a movie studio, an actor, a company, or a particular genre or theme. A service provider may deliver the portal in an interactive programming guide sent to the set top boxes of its subscribers. The portal may be interactive such that subscribers may order or watch the content presented on the portal. A content provider may create or edit the portals and send the portals to the service provider. The delivery of the portal to the service provider by the content provider may be through an application programming interface.

25 Claims, 7 Drawing Sheets

METHODS AND SYSTEMS FOR PROVIDING ONE OR MORE TOPIC SPECIFIC PORTALS

BACKGROUND INFORMATION

Some service providers provide television guides and interactive programming guides to help viewers find programs to watch. A television guide may be in a form of a dedicated channel that automatically scrolls through a channel listing and displays the media programs per channel for the next few hours. An interactive programming guide may also display channels and media programs per channels. Unlike a television guide, a viewer may be able to navigate through the interactive programming guide by scrolling through the channels in the direction that the viewer wants. The viewer may also be able to scroll forward in time to view the channels and the programs on the channels for future time periods. The interactive programming guide may also allow the viewer to select a particular program to watch or to provide additional information about the program. In some cases, the viewer may select a particular program to be recorded by a digital video recorder associated with the interactive programming guide.

The number of channels and programs offered through the interactive programming guide may be immense and make it difficult for some viewers to find the programs they want to watch in a timely manner. Moreover, considering the number of choices presented to the viewers, it may be difficult for a particular media content provider to present all of its services in an organized manner or in a manner that is easily recognizable by the viewers.

BRIEF DESCRIPTION OF THE SEVERAL VIEWS OF THE DRAWING(S)

DETAILED DESCRIPTION OF PREFERRED EMBODIMENTS

Exemplary embodiments are described hereinafter with reference to the accompanying drawings, in which exemplary embodiments and examples are shown. Like numbers refer to like elements throughout.

Embodiments generally relate to methods, computer program products, apparatuses, and systems for providing one or more brand or topic specific portals. The brand portal may be provided through an interface delivered to the user through a set top box. The brand portal may be configured to provide a location in which related content items and information may be aggregated and presented in a manner that is aesthetically pleasing and convenient to the user and a location in which a content provider or a service provider can market and up sell additional content items.

Figure 1:
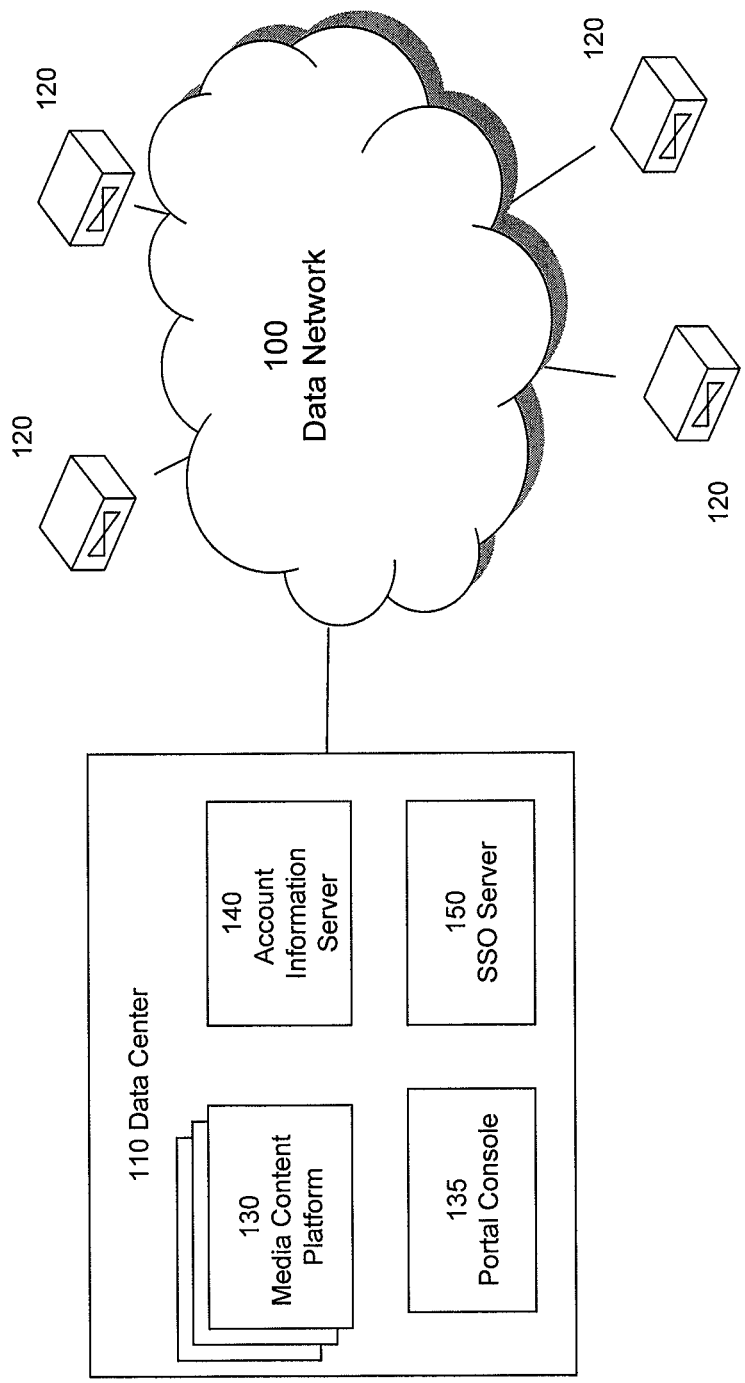
FIG. 1 is a block diagram of a data network consistent with an exemplary embodiment.

FIG. 1 illustrates a data network 100 consistent an exemplary embodiment. The data network may be wired or wireless (e.g., satellite) or a combination of both. The data network may include a Wide Area Network ("WAN"), a Local Area Network ("LAN"), an intranet and/or the Internet. As a more specific example, at least part of the data network may be part of a fiber optic network, such as fiber-to-the-home ("FTTH"), fiber-to-the-premises ("FTTP"), fiber-to-the-curb ("FTTC"), fiber-to-the-X ("FTTX") and other fiber optic networks of one or more service providers configured to deliver services to a number of users or subscribers. For example and as illustrated, the data network 100 may include or otherwise be in communication with a provider's data center 110 that delivers signals that represent content items to set top boxes 120 associated with users or subscribers of the service provider.

As used herein, a service provider is an entity (e.g., a company, a municipality) that delivers a service to the users such as delivering content items, (e.g., television shows, games, movies), Internet access (e.g., cable, DSL) and/or telephone services (e.g., cellular or plain old telephone service ("POTS")). A content provider is an entity that produces, creates, aggregates, or otherwise provides the content items that is delivered or distributed by a service provider. For example, cable channel companies (e.g., ESPN, HBO, and CNN) and movie studios (e.g., Paramount, United Artists, and MGM) are content providers because these companies create television shows and movies that are distributed through the network of the service provider. An entity may be both a content and service provider.

Figure 2:
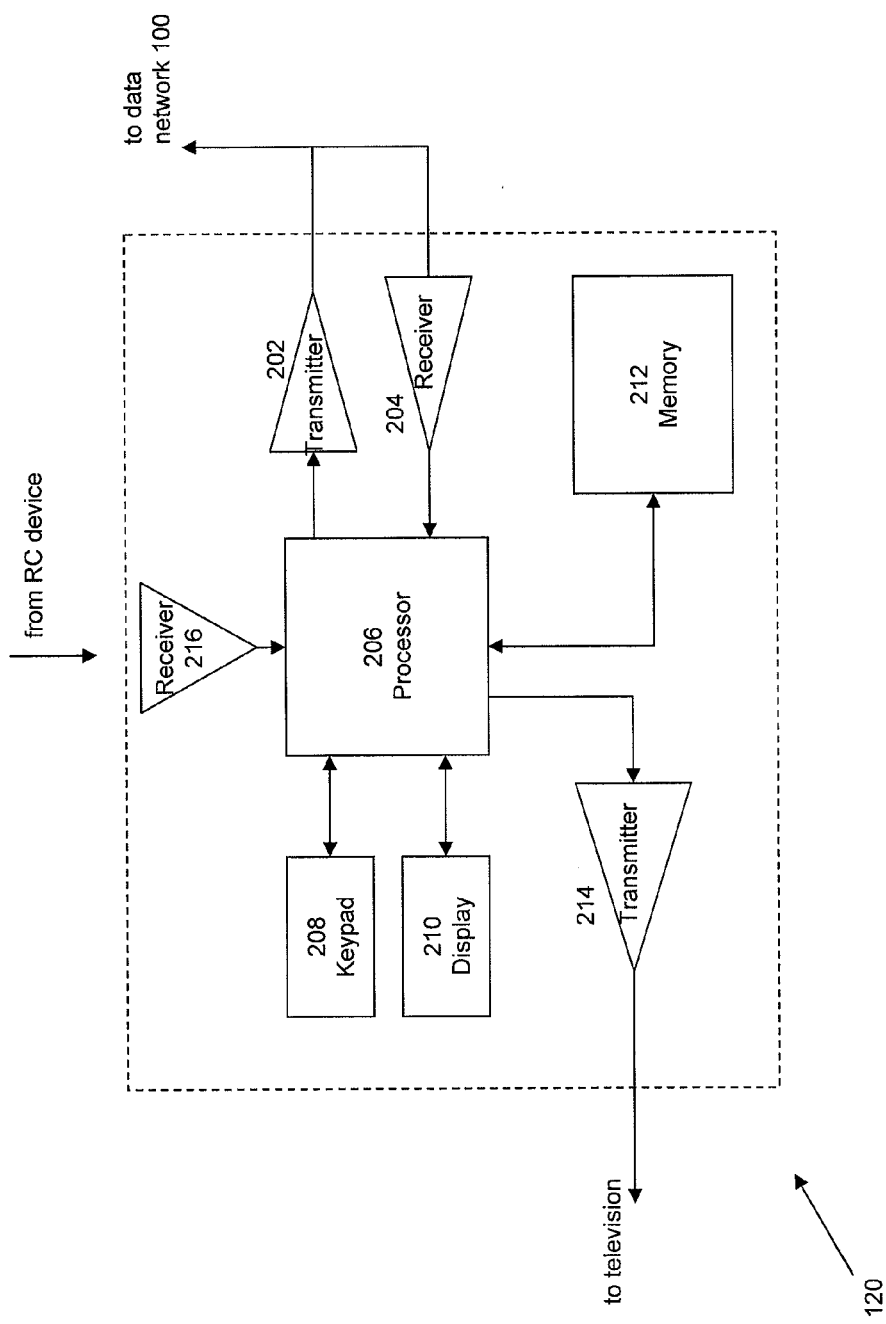
FIG. 2 is a block diagram of a set top box consistent with an exemplary embodiment.

In general, a set top box 120 may be configured to receive one or more signals representing content items, referred to herein as content signals, from an external source and convert the content signals into the content items for display on a television that is in communication with the set top box. As shown in FIG. 2, the set top box 120 may include a first transmitter 202, a first receiver 204, a processor 206, a user interface such as a keypad 208, a display 210, at least a first memory element 212, a second transmitter 214, and a second receiver 216.

The first receiver 204 is configured to receive the content signals from the external source through the data network 100. For example, the set top box may include an adapter or port for receiving a fiber optic cable or a coaxial cable of the data network or a wireless receiver, such as an antenna. And the external source may be one or more media content servers or other computing devices of a service provider that is communicatively coupled to the set top box 120 through the data network 100.

The processor 206 may be configured to provide processing and command functions, which may include translation or conversion of the received content signals into an output suitable for display on the television. The processor 206 may also be configured to send the content items through the second transmitter 214 of the set top box 120 to the television. Although not illustrated, the set top box may have a third transmitter and the processor 206 may be configured to process the received content signals into two outputs, e.g., a video output sent through the second transmitter for display on the television and a sound output sent through the third transmitter to a sound system either integrated with the television or a stand alone system.

The display 210 of the set top box may include information such a clock and/or the current channel for the television, and/or indicators on whether or not the set top box is powered on and/or whether it is recording.

In instances in which the user interface includes a keypad, the keypad 208 may include one or more buttons to allow a user to enter commands and selections into the set top box 120. The second receiver 216 may be configured to receive radio signals from a remote control device (not illustrated) as another method of receiving commands and selections from a user.

The processor 206 may also be configured to send a request through the first transmitter 202 to the service provider for a content item, such as a particular media program (e.g., a television show or movie) based on commands and selections from the user. The request may include a live media program or for a video on demand ("VOD") asset. The processor 206 may also record the content signals for the requested media program into the memory element 212 based on commands and selections from the user (e.g., the set top box may include a digital video recorder ("DVR")). For example, the user may request for a future media program to be recorded. At the scheduled time for the media program, the processor 206 may request the corresponding content signals for the media program and store the content signals into the memory element. The stored or recorded media program is viewable to the user upon request. In particular, the processor 206 may retrieve a recorded media program from the memory element 212 and send it to the television to be viewed by the user upon request from the user. The memory element 212 may also maintain programming instructions, i.e., software, pertaining to the functions and operability of the set top box.

The set top box 120 may also be configured to receive content signals from the service provider that represent an interactive programming guide ("IPG") for the user. In particular, upon request from the user, the processor 206 sends a request to the service provider for the signals that provide the IPG. In response to the request, the service provider sends the IPG to the set top box 120. The IPG may be customer specific, i.e., the service provider may send an IPG that corresponds to an account of the user, which may take into consideration the channels available to the user based on the location of the set top box and the subscription of the user, e.g., a basic channel package or a channel package with premium channels.

The processor 206 sends the IPG to the television for interaction with the user. The IPG may display a listing of channels, times, and programming and the user may browse through the listing through either the keypad 208 or remote control device. The user may be able to select programs to watch or to be recorded, call up recorded programs, and/or order videos on demand. The processor 206 either executes the selections or stores them within the memory element 212 for future execution. In instances where the service provider provides video games, the user may also be able to view and select the video games through the IPG.

It is understood that the set top box may be a stand alone device or be integrated within the television. Moreover, a television may be any monitor capable of displaying the content items from the set top box. For example, a television may be a LCD display or monitor.

Referring back to FIG. 1, the data center 110 may provide a platform for managing information or communications between the data network 100 illustrated in FIG. 1 and other networks, such as the Public Switched Telephone Network ("PSTN"), a private branch exchange ("PBX"), or the Internet. The data center 110 may also provide gateway functions, such as code and protocol conversions, to transfer information or communications between different networks. The data center 110 may be implemented using any one or a combination of hardware, software, and/or firmware. For example, the data center 110 may be implemented using a plurality of general purpose computers or servers that are co-located or located in more than one location. The data center 110 may include or otherwise be in communication with a media content platform 130 (e.g., one or more media content servers). The media content platform 130 collectively provide at least some of the storage and processing functions (e.g., the platform 130 may include a processor and one or more memory elements) for the service provider for delivering the content signals to the set top box 120. The data center 110 may also include an account information server 140 and a single sign on "SSO" server 150. In general, an account includes information and/or instructions pertaining to a particular user. The SSO server may be configured to authenticate and approve access to information stored within the account information server 140 or other information stored in additional servers of the data center 110. In particular, the user may access his account on the account information server 140 by logging on through the SSO server 150. For example, the user may be able to log on through a web page on a computing device (not illustrated) in communication with the data center 110 through the data network 100. Although the data center 110 is shown with direct connections to the data network 100 any number and type of network elements may be interposed between the data center 106 and the data network (e.g., LCR, GWR, BHR, and other routers, and/or optical line terminals).

Referring back to the IPG sent to the set top box and presented to the user on an associated television. The IPG may include one or more portals. The IPG may list portals in a similar manner as the channels are listed or provide a menu selection for going to one or more portals. For example, the portals may appear in a channel column along with the conventional channels. As another example, the IPG may include tabs for channels, VOD assets, and portals. In some instances, the IPG may have a main tab for portals and numerous subtabs for the different types of topics of the portals. The subtabs may help the user to search for particular portal. A user may select a portal through the user interface device of the set top box or the remote control device. The portal provides a single location (e.g., a single screen) for presenting or aggregating content items based on a content provider, a genre, a particular television show, or one or more other context specifications. The content items may include, but are not limited to, episodes of a television program, movies, games, merchandise, music, images, information regarding cast members, and review boards. The topic may include, but are not limited to, a particular television program, a particular movie, a move studio, an actor, a company, a theme or genre, and a cable or television station.

Figure 3:
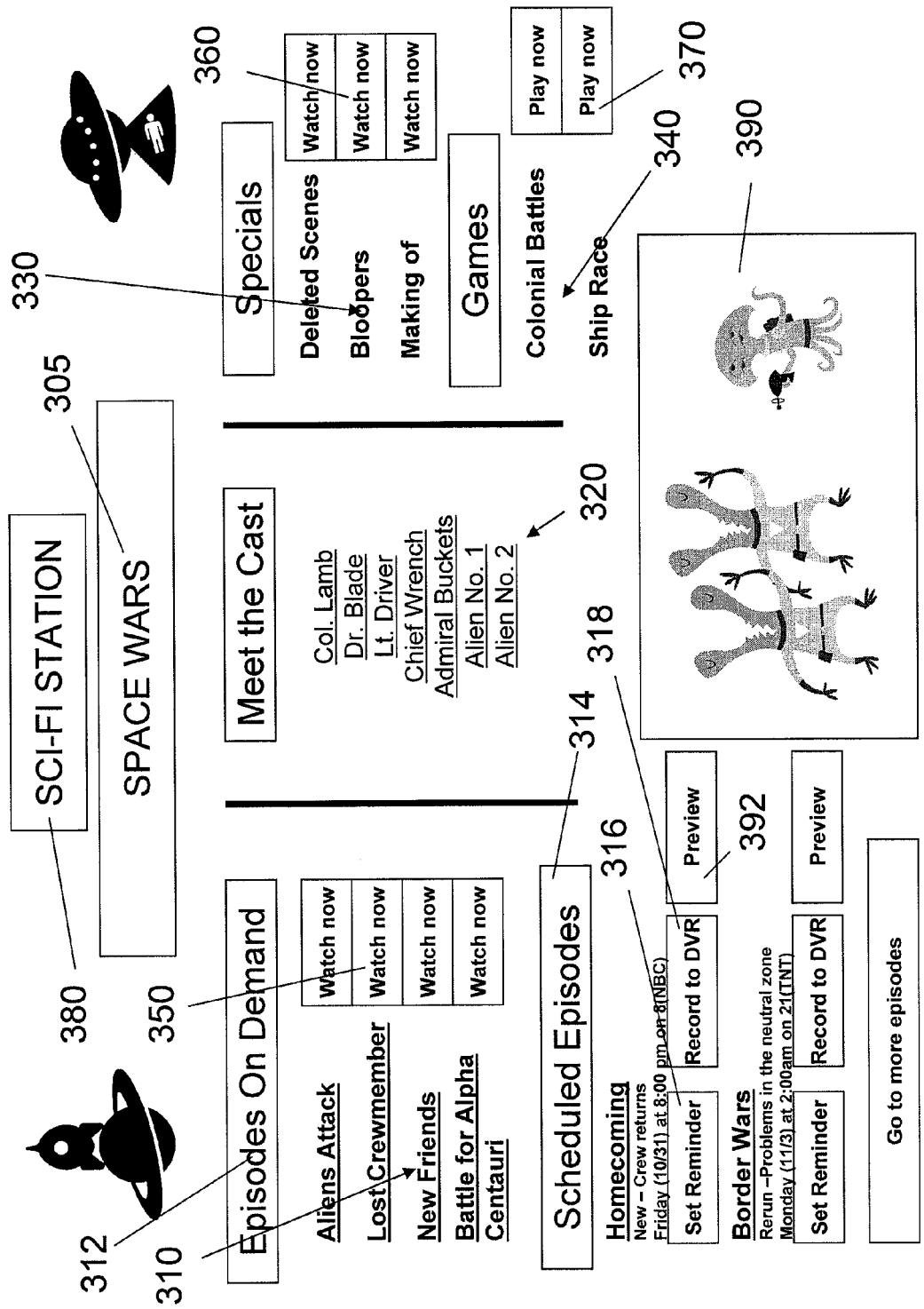
FIG. 3 is a block diagram of a portal consistent with an exemplary embodiment.

FIG. 3 illustrates an example of a portal 300. In this example, the portal 300 is for a particular media program 305, a sci-fi television program. The portal 300 presents content items of various types and manner to the user that is related to the program. For example, the portal 300 may present the individual episodes 310, a listing of the characters 320 or members of the cast for the program, a listing of specials 330 such as deleted scenes, bloopers, and/or a feature on how the program is produced, and/or games 340 related to the program. Other content items (not illustrated) may include, but not is limited too, still images, soundtracks, merchandising, viewer feedback, discussion boards, etc. The presentation of the content items may take several forms, for example, the content items may present through one or more visual elements, such as text boxes, graphics, or other visual indicators, or one or more audio elements, such as a sound clips, narrative, or songs.

The portal 300 may be interactive such that the user may be able to select on a presentation of a particular content item to access that content item. For example, the user may be able to select a particular episode or special to watch or game to play by selecting a command icon 350, 360, 370 or other link. As another example, the user may be able to select a particular character for more information about a character of the show or the actor or actress that plays the character. A user may be able to select a particular content item by "clicking" on the element of presentation, such as a text box, an icon, or other link. In instances that the user may select on the text box, the text box may have an embedded link for accessing the content item. The information may be presented by directing the user to another screen or the portal may include expandable text boxes or display windows to present the information on the same screen of the portal.

Referring back to episodes, the portal 300 may present episodes on demand 312, i.e., episodes that are available to be watch on command (referred to herein as "on-demand content items"). More specifically and as illustrated, the user may be able to order a particular episode (e.g., Lost Crewmember) by selecting a command icon 350 allowing the user to watch the episode within a predetermined time interval (e.g., 24 hours). Other on-demand content items may include, but are not limited to, games that are available to be played by the user, songs that are available to be listed to by the user, or any other content-item that the user is able to access immediately.

The portal 300 may also present scheduled episodes 314. The scheduled episodes 314 may include episodes that are scheduled within a predetermine time interval (e.g., two weeks) to be broadcasted on a particular station at a particular time (referred to herein as "scheduled content items"). For example, the portal 300 may provide information such as the time, date, and station of scheduled episodes 314 and/or the titles, short descriptions, intervals of the scheduled episodes 314. The user may be able to either set up a reminder (e.g., having a notification message sent to the user's television at a predetermined time interval before the start of the schedule episode) or send a recording command to the user's DVR to record a scheduled episode by selecting a command icon 316, 318.

The portal 300 may also have one or more video windows 390 (e.g., a picture in a picture ("PIP")) for presenting or streaming one or more video signals. The video signals may represent an advertisement related to the topic of the portal, a preview of a related program or movie, or one of the programs or movies listed on the portal. The user may be able to select the content item being viewed in the video windows 390. For example, the user may be able to select to watch a preview of a scheduled episode by selecting a command icon 393. The preview may be presented in the video window 390. Instead of or addition to the user selecting the content item to be viewed in the video window, the service provider and/or content provider may select the content item to be viewed. For example, the service provider and/or content provider may provide viewing instructions regarding which content items are to be viewed in the video window absent input from the user to view a particular content item in the window.

One portal may be linked to other portals. For example, a particular station or channel may sponsor and show the media program 305 that is the subject of the portal 300. The user may be able to select the channel icon 380 in order to be directed to a portal for the channel rather than just for the media program. The channel portal (not illustrated) may present various television shows and other features that are related to the channel. Each television show presented on the channel portal may have an icon that allows the user to be directed to the television show specific portals.

As another example, portals may have other links to additional portals. One such link may be through an actor or an actress. Referring back to the example of FIG. 3, a user may be able to select one of the characters, such as Col. Lamb, which may redirect the user to another portal that is specific to the actor who plays Col. Lamb. This portal may present movies and other shows that the actor has or is starring in.

The examples so far have described a portal related to a particular television program, a cable or TV channel, and an actor. Other embodiments may include, but are not limited to, movie studio, genre or theme, and company specific portals.

The movie studio portals may include links to or provide information about on-demand content items and scheduled content items related to a particular movie studio. For example, the portal may present to the user one or more movies owned or otherwise related to the movie studio that the user can order to watch or present movie previews (e.g., trailers and teasers) of upcoming movies associated with the movie studios that the user can watch. As another example, the portal may present one or more movies that are scheduled to be broadcasted, including the time, date, and channel for the scheduled broadcast.

Examples of genre or theme portals include, but are not limited to, a sports portal or a kid portal. The sports portal may present sport related content items such as upcoming games, replay of classic games, sport specials, interviews with athletes, team information, sport related channels, etc. Similarly, the kid portal may present content items considered appropriate for kids (or kid safe) such as cartoons, G-rated movies and shows, kid focus channels (e.g., Noggin and Nickelodeon), and games.

A company specific portal may present content items regarding a particular company. For example, a General Motors portal may present information regarding its products, such as cars and trucks. The information may be presented through icons of the individual cars and trucks that a user may select to learn more information about. The company may present its commercials through the portal to allow the users to view them at their command. The company specific portal may also present scheduled content items. For example, General Motors may present media programs scheduled to be broadcasted relating to General Motors (e.g., General Motors may be the subject of or a sponsor of one or more scheduled media program).

Referring back to FIG. 1 and as explained above, the content items presented in a portal was received by the set top box in the form of content signals and converted for suitable display on the television. The content signals may be generated, received, and/or stored by the media content platform. The media content platform may send the content signals to the set top box upon receiving a request from the set top box.

The information or content items on the portals may change over time with additional information, such as new episodes and new features. Therefore the corresponding content signals may change. The changes to the signals and, thus, the content items, may be done by either the service provider or the content provider. For example, the service provider may have a console 135 in communication with the media content platform for creating and editing portals.

Figure 4:
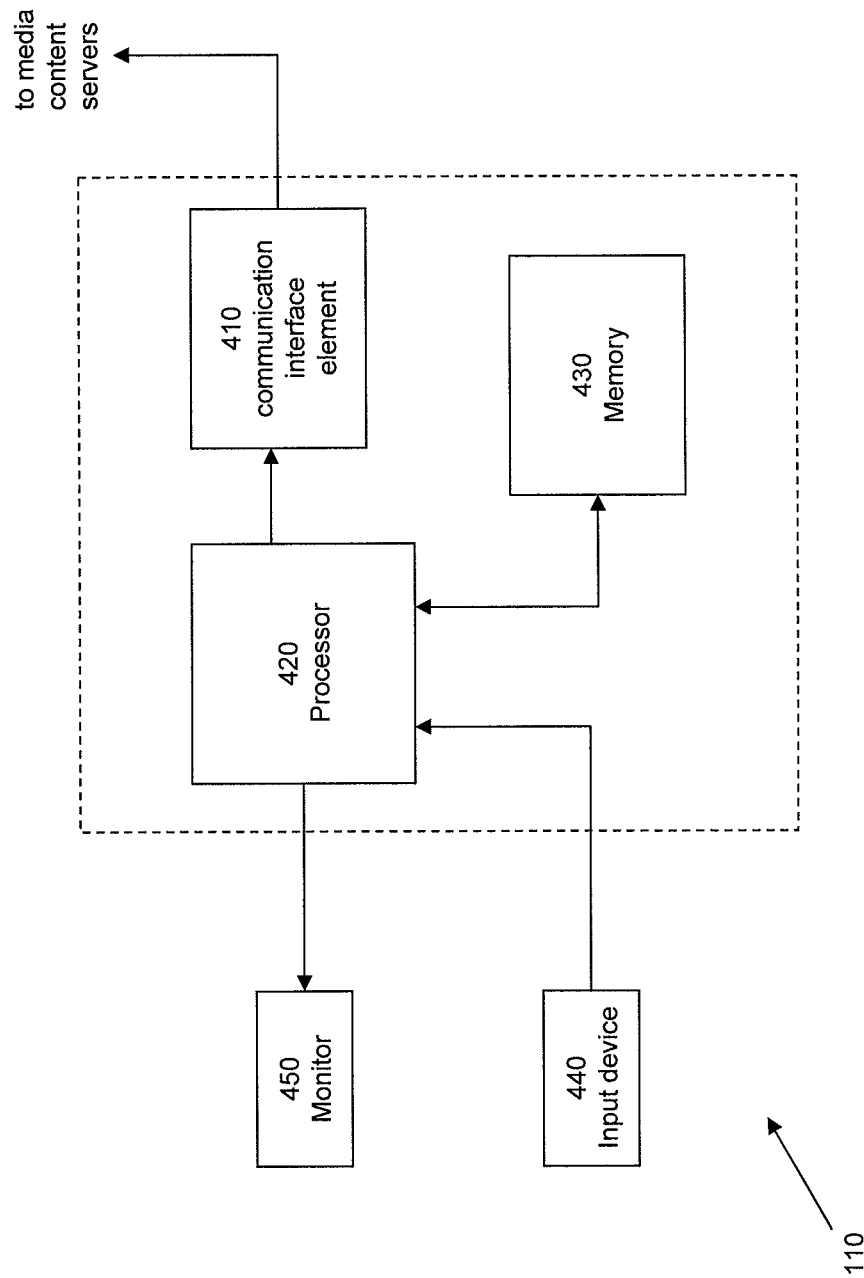
FIG. 4 is a block diagram of a console consistent with an exemplary embodiment.

As shown in FIG. 4, the console 135 may include a communication interface element 410 (e.g., a receiver element and a transmitter element), a processor 420, a memory element 430, an associated user input device 440, and an associated monitor 450.

The communication interface element 410 (e.g., a wired or wireless network interface card ("NIC") or a modem) is configured to send and receive data to and from the console 135 to the media content platform and/or data networks such as the Internet.

The processor 420 may be configured to provide processing and command functions, which may include translation or conversion of data received through a data network or the media content platform or between associated software applications of the console 135. The processor 420 may be able to send signals suitable for display on an associated monitor 450 and/or in accordance with the associated software applications of the console. The memory element 430 may maintain at least some of the programming instructions pertaining to the functions and operability of the console 135.

The console 135 may have one or more associated user input devices 440. A user input device 430 may be integrated into the console 135 or be a peripheral device in communication with the console 135. In general, a user input device 440 is configured to allow an operator to enter commands or selections into the computer device 110. For example, the user input device 440 may be a mouse, a keyboard, a touch screen mechanism, or an audio or video sensor.

The console 135 may have various communication software applications either stored in the memory element 430 and/or stored in another computer-readable medium (e.g., DVD, CD, disk drive, zip drive, etc). One of the software applications may provide the programming instructions for the processor 320 to display a graphical user interface ("GUI") on the monitor and to receive user input via the GUI to allow the operator to access, view, edit, and interact with portals or content items stored on the media content platform and/or to generate or create a portal and send it to the media content platform. For example, the operator may be able to add or edit information to a template that defines the portal. The template may provide a visual representation on how the portal will appear to the users. For example, the template may indicate the location and type of content item which will be displayed. The template may provide for multi-level navigation. Activities may include, but are not limited to, adding text, images, video and audio files or embedding links to such files. The video and audio files may be stored in or accessible by the media content platform and selection of the embedded links may represent a command for the set top box to request and receive (including, in some instances, as a data steam) the files from the media content platform when the user selects the link. The edits and changes made to the portal are communicated to the media content platform such that the edits and changes are reflected in the content signals sent to the set top boxes.

Rather than rely on an operator to enter changes to the portal, in some embodiments, some of the changes and edits may be done automatically. For example, the processor(s) of the media content platform and/or the console may be configured to search the content item stored in or accessible by the media content platform and determine appropriate content item for one or more of the portals. The content items may include metadata fields that describe the content. The metadata fields may provide a title, a rating (e.g., G, PG-13, PG, R), actors in the content item, if applicable, ownership (e.g., a movie studio) and genre of the content item. The media content platform and/or the console may use the metadata fields to create at least portions of the portals. Alternatively, the processor of the set top box may be configured to search the metadata of the IPG signals in order to create at least portions of the portals.

As a more specific example, in the instances that a portal includes scheduled episodes, a processor (e.g., a processor of the media content platform, console, or set top box) may be configured to populate the scheduled episodes information for the portal through a search of the metadata of the IPG signals associated with the set top box. In particular, at least a portion of the information provided on the portal, such as the scheduled episodes may correlate with or be linked with at least a portion of the information provided through the IPG signals. For example, the metadata may include a specific field identifier that is associated with one or more portals, which is used by the processor to determine whether a particular content item should be used to populate a portion of the portal. Once the content item is identified as being related to a portal, the processor may use the information in the metadata to present in the portal. Again, referring to the schedule episodes, the processor may present the title, the rating, actors in the content item, a short description of the content item, time/date of broadcast or other information in the metadata on the portal. As another example, rather than searching for a specific field identifier, a processor may search conventional metadata fields, such as the title or actors in order to identify the relevant episodes. A processor may be configured to conduct a text search of the title field or actor field for particular keywords associated with one or more portals. The detection of certain keywords may be a basis to identify at least some of the content items for one or more portals.

Figure 5:
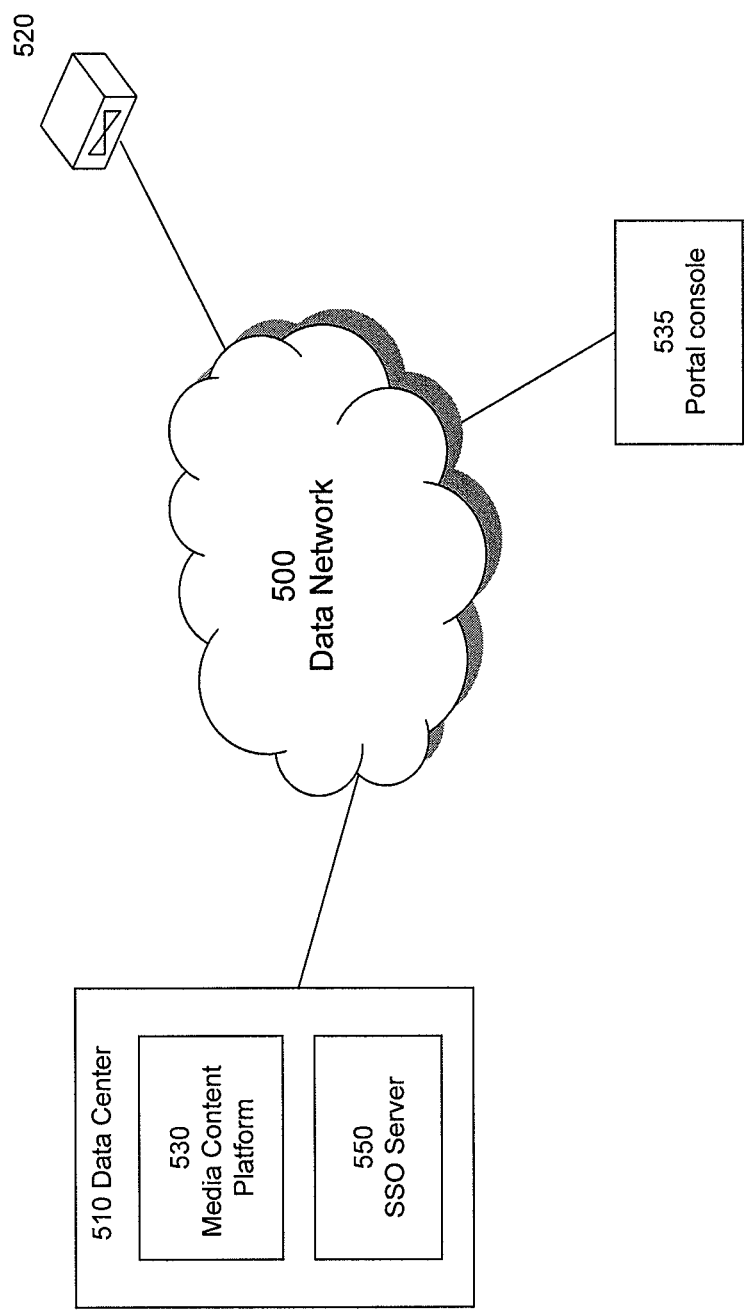
FIG. 5 is a block diagram of another data network consistent with an exemplary embodiment.

Rather than or instead of having the service provider create and update the portals, in other embodiments, the content provider may perform these tasks. For example, as shown in FIG. 5, the content provider may operate a console 535 that is connected to the media content platform 530 through the data network 500 (and through an application programming interface "API" and/or a toolset). The data network 500 may be the network maintained and operated by the service provider or may be at least partially a third party network and/or the Internet. In general, the console 535 of the content provider allows the content provider to send one or more instructions regarding the creation or edits of portals to the service provider. The service provider may create or edit portals in accordance with the received instructions and then send the portals to the set top boxes 520. This type of arrangement may allow the content provider to have more control of the information that is presented to the users on their portals. Moreover, this type of arrangement may also reduce the workload of the service provider and, thus, save time and resources of the service provider. To assist the content provider, the service provider may provide a template of a portal as described above. The content provider may be able to populate the template with content items. The use of the template or templates may provide for more consistent portals between different content providers.

The data center 510 (e.g., the SSO server 550) may be configured to authenticate and approve access to portals or other information stored on the media content platform 530 by a content provider. Also, the information accessible to the content provider may be limited to content items or other data related to the content provider. For example, the media content platform 530 may store content items and other data according to one or more folders. A folder may represent content items, portals, and other data related to the content provider. The content provider access may be limited to data stored in the folder associated with the content provider and thus would prevent the content provider from having access to data of a rival content provider or other organization.

Referring back to the use of templates, the template may provide the content provider with a representation on how its portal is currently seen by the users. Specifically, the template may show the links to the content items and other information currently shown to the user. The content provider may be able to make changes through the template that will be reflected in the portal as seen by the users. For example, the content provider may send instructions to the service provider to change the text describing a particular on-demand content item or to replace or add on-demand content items.

To assist the content provider with changes, the content provider may have access to the folder of stored content items and other information associated with the content provider. The access may help the content provider understand what on-demand content items or other content items are available for the portal. In some embodiments, the content provider may be able to send additional content items or information to the folder. Once received in the folder, it may become available for the portal.

The changes or edits made by the content provider may be sent to the media content platform as instructions to be carried out by the media content platform. The media content platform may be configured to implement the instructions immediately or within a particular time period. For example, the media content platform may be configured to implement each instruction received regarding any of the portals stored within the media content platform at a particular time, such as 12:00 am local, each day.

Although the content provider may create and update the information on its portal, in some embodiments, the creation and updates may be subject to a validation check from the service provider. For example, the service provider may require that any portals and changes of portals be reviewed by an operator of the service provider to ensure the portal or changes comply with any rules or policies of the service provider regarding portals. As another example, the media content platform may be configured to automatically check particular aspects of a portal or changes to a portal. As a more specific example, the media content platform may be configured to conduct key word searching to minimize the likelihood of offensive language from being presented through a portal.

Referring back to the use of the metadata as a way to identify relevant content items for the portal, the metadata may be provided by the service provider, the content provider, or another third party. Similarly, the service provider, the content provider, or another third party may provide instructions how the processor or processors should identify the relevant content items, e.g., text searching of metadata fields.

Figure 6:
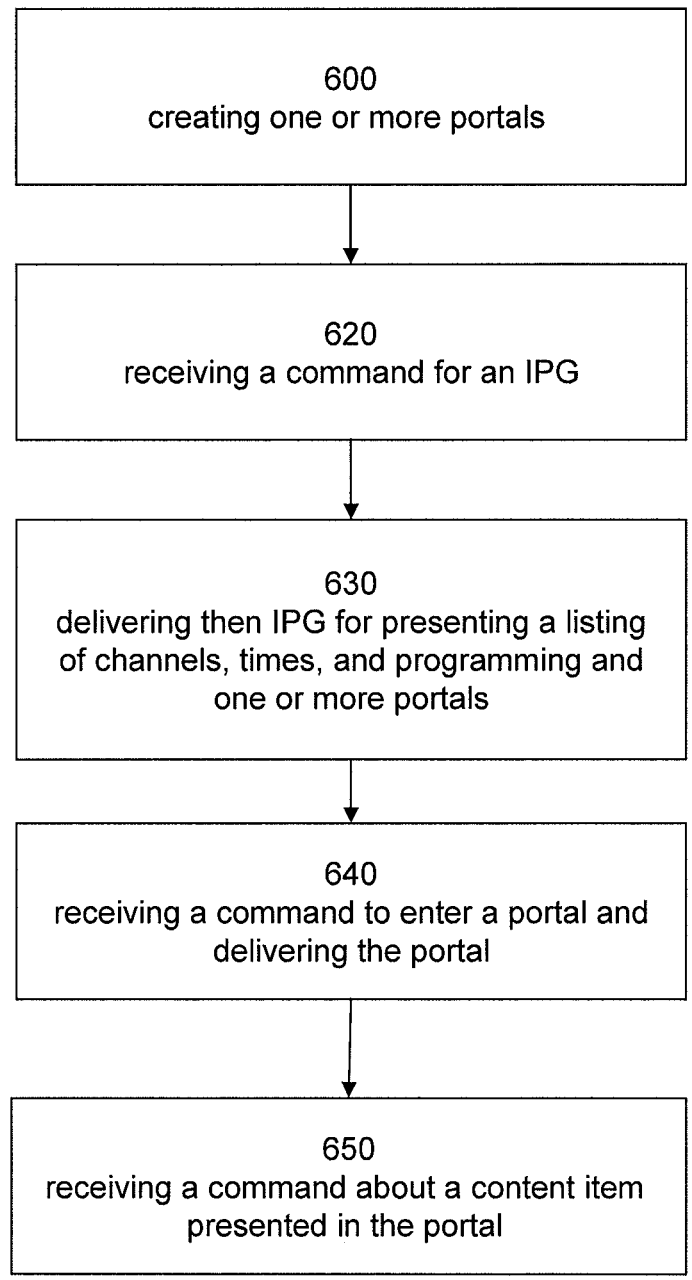
FIGS. 6-7 are flow chart illustrations of methods consistent with exemplary embodiments.

FIG. 6 illustrates a method for providing a portal from the perspective of, for example, the service provider. The method may include creating one or more portals 600, such as by defining and providing a template, such as to the content provider; and receiving instructions about one or more portals through a data network, again for example, from the content provider. The method may also include receiving a command for the interactive programming guide 620 from, for example, a user or customer. The interactive programming guide may be configured to present a listing of channels, times, and programming and one or more portals may then be delivered 630. As described, each portal is generally configured to present content items relating to a common topic at a single destination, such as a single screen of a user interface. A command to view or access a portal may be received and the portal may then be delivered and displayed 640. Another command may thereafter be received regarding a content item presented in the portal 650. The service provider may then execute the command, e.g., deliver the content item, set a reminder regarding the content item, or record the content item.

Figure 7:
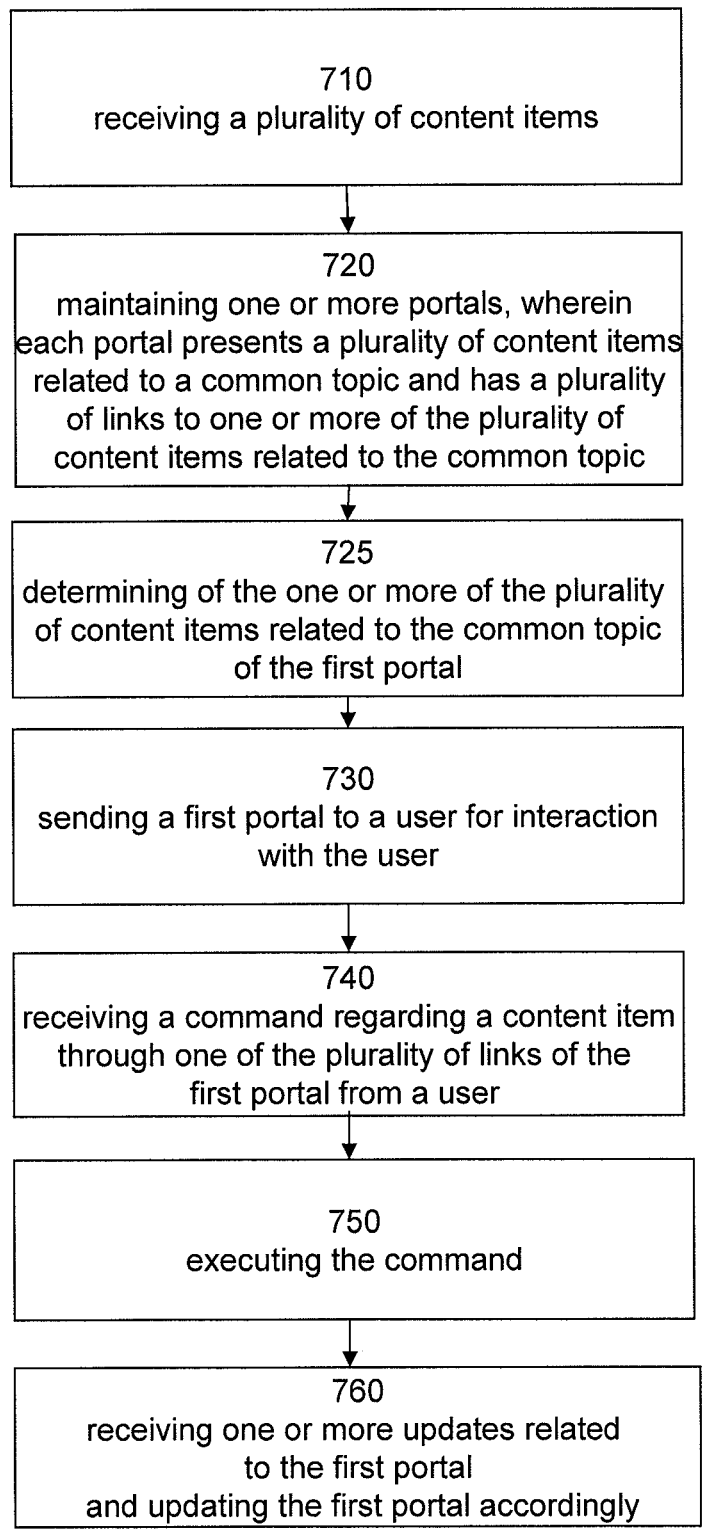

FIG. 7 illustrates another method according to exemplary embodiment. The method may include receiving a plurality of content items related to a plurality of topics 710. For example and as discussed above, the content items may be individual episodes of a media program, advertisements (such as a trailer, teaser, commercial, etc.), special programs (such as a documentary, deleted scenes, or bloopers), bloopers, games, still images, or soundtracks. The method may also include maintaining one or more portals 720. Each portal may present a plurality of content items related to a common topic (also referred to herein as a branded portal) and may have a plurality of links to the plurality of content items related to the common topic. For example and as explained above, one or more of the links may be embedded into visual elements such as text boxes and icons.

In some embodiments, one or more links may be created by determining the content items that are related to the common topic and then creating links for the portal to the content items determined to be related 725. The determination may be through a search of metadata associated with the media items for a particular code identifier or keyword search. The searching criteria may be established by at least one of the service provider or the content provider.

The method may also include receiving one or more changes or edits for the portal, for example, through the data network. In response, an existing portal may be revised or updated and the updated portal may then be delivered and displayed. For example, the method of FIG. 7 further includes receiving one or more updates for the portal 750 which may include additional or replacement links and/or other elements to be displayed in the portal.

The method of FIG. 7 may further include receiving a command for the portal from a user; sending the portal to the user for interaction with the user 730; receiving one or more commands regarding one or more content items through the one or more links of the portal 740; and executing the one or more commands 750. For on-demand content items, the command may be to order, watch, or play the content item. For a scheduled content item, the command may be to set a reminder or to record the content item.

The operations of FIGS. 6 and 7 may be performed through hardware, software, or combination thereof. Therefore embodiments may take the form of hardware systems and/or apparatuses, software, or combinations thereof. As an example, embodiments may include a computer program product stored on a computer-readable storage medium (i.e., software) comprising of one or more executable portions for performing the operations described herein. As another example, one or more apparatuses and/or systems may perform one or more of the operations. In one embodiment, a processor of a server of the data center, such as a media content server, may be configured to perform one or more of the operations depicted in FIG. 6. In other embodiments, a processor of a set top box may be configured to perform one or more of the operations.

The processor of a set top box, a console, or of a server of the data center disclosed herein may be embodied in many ways. For example, a processor may be embodied as a coprocessor, a controller or various other processing means or devices including integrated circuits such as, for example, an application specific integrated circuit ("ASIC"). The memory elements described herein may be various memory structures including volatile and non-volatile memory structures. Any of the memory elements may be configured to store information, data, applications, instructions or the like for enabling the devices disclosed herein to carry out various functions in accordance with exemplary embodiments, such as by storing software that is executable by the processor to cause the various functions of the processor that are described herein to be performed. For example, a memory element could be configured to buffer input data for processing by a respective processor.

Embodiments described above include methods, apparatuses, and systems for generating and delivering branded portals. A branded portal may help to break the barrier of time when time is defined by content consumption patterns, e.g., broadcast television vs. DVR. In general, a portal allows for the aggregation of content items in a way that may be meaningful for a user. The aggregation and the presentation layers may be based on context specifications. For instance, if a user enters a Kids portal, the user may find a content item in a video window that is coming from a live show airing on channel X (i.e., live television) or it may be from a VOD asset. The portal may also present description of upcoming shows in various channels related to providing content items for kids and may provide an option to add a reminder or even to add a particular content item to the user's DVR. The portal may include a link or tab for displaying previous episodes coming from VOD assets and promoting an upcoming show. The alternatives and combinations of portals and options through portals are numerous.

In many instances, the portals allow content management groups (including internal and external groups to the service provider) to aggregate and provide interaction options available through the service provider's system in one destination that is manageable by either the service provider, content provider, or both.

For example, management by a content provider may allow the content provider to better market one or more of its content items. In a case of a movie studio, a movie studio may be preparing to release a new movie that is a sequel, e.g., a new Batman movie. The movie studio may use a portal to develop interest in the new Batman movie by presenting information on the portal about the new movie, e.g., cast members, plot, behind the scene information and the trailers or teasers for the new movie. The movie studio may also present information of scheduled content items related to Batman such as the scheduled times of earlier Batman movies or programs being broadcast on one or more channels in attempt to build more interest in the new Batman movie before it is released.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

The invention claimed is:

1. A method comprising:
maintaining, by a computing device, a first portal configured to present a plurality of content items related to a common topic and a plurality of links to the plurality of content items related to the common topic of the first portal, and wherein the plurality of content items includes at least one on-demand content item and at least one scheduled content item;
automatically determining, by the computing device, that a particular content item matches the common topic of the first portal by detecting a specific field identifier within metadata fields associated with the plurality of content items and that identify the particular content item as matching the common topic of the first portal, the metadata fields being provided to a user device as interactive programming guide signals; and
populating, by the computing device, at least a portion of the first portal with the particular content item based on the detecting the specific field identifier.

2. The method of claim 1 further comprising receiving a plurality of content items related to a plurality of topics and determining the plurality of content items related to the common topic of the first portal from the plurality of content items related to the plurality of topics.

3. The method of claim 1 further comprising providing a template of the first portal to a content provider associated with the common topic over a network and providing access to the plurality of content items related to the common topic.

4. The method of claim 3 further comprising receiving one or more changes for the first portal from the content provider through the template and updating the first portal according to the one or more changes.

5. The method of claim 1 further comprising providing an interactive programming guide configured to present a listing of channels, times, and programming and one or more portals including the first portal.

6. The method of claim 5 further comprising receiving a command from a user to access the first portal through the interactive programming guide.

7. The method of claim 5 further comprising at least partially generating the first portal based on data provided with the interactive programming guide.

8. The method of claim 1, wherein the specific field identifier identifies a company and the first portal plays advertisements for the company through the first portal.

9. The method of claim 1, wherein the specific field identifier identifies at least one of the following common topics for the portal: a title, a parental control rating, an actor, and a genre of the content items.

10. The method of claim 1, further comprising upon receiving a user selection of a character in the plurality of content items related to the common topic of the first portal, redirecting the user to another portal that features other content items in which an actor playing the character appears.

11. The method of claim 1, wherein the user device comprises a set top box.

12. A method comprising:
providing, by a computing device, an interactive programming guide configured to present a listing of channels, times, and programming and one or more portals to a user;
receiving, by the computing device, a command to access a first portal of the one or more portals, wherein each portal presents a plurality of content items related to a common topic and has a plurality of links to the plurality of content items related to the common topic of the portal;
automatically determining, by the computing device, that a particular content item matches the common topic of the first portal by detecting a specific field identifier within metadata fields associated with the plurality of content items and that identify the particular content item as matching the common topic of the first portal, the metadata fields being provided to a user device as interactive programming guide signals;
populating, by the computing device, at least a portion of the first portal with the particular content item based on the detecting the specific field identifier; and
providing, by the computing device, the first portal to the user, wherein
the plurality of content items includes at least one on-demand content item and at least one scheduled content item.

13. The method of claim 12, wherein the first portal provided to the user includes a video box for displaying at least one of the plurality of content items and further comprising displaying the at least one of the plurality of content items in the video box.

14. The method of claim 13 further comprising receiving a command from the user through the first portal to display the at least one of the plurality of content items in the video box.

15. The method of claim 14, wherein the first portal includes a listing of scheduled content items related to the common topic and further comprising generating the listing based at least partially on the interactive programming guide.

16. The method of claim 12 further comprising receiving a command regarding at least one of the plurality of content items from the user through the first portal and executing the command regarding the at least one of the plurality of content items.

17. The method of claim 16, wherein the command regarding at least one of the plurality of content items includes at least one of setting a reminder regarding the at least one of the plurality of content items, recording the at least one of the plurality of content items, and displaying the at least one of the plurality of content items.

18. A system comprising:
a media content server, embodied in hardware, configured
to receive a plurality of content items related to a plurality of topics;
to maintain one or more portals, wherein each portal is configured to present a plurality of content items related to a common topic and has a plurality of links to the plurality of content items related to the common topic of the portal,
wherein a first portal within the one or more portals includes at least one on-demand content item and at least one scheduled content item;
to automatically determine that a particular content item matches the common topic of the first portal by detecting a specific field identifier within metadata fields associated with the plurality of content items and that identify the particular content item as matching the common topic of the first portal, the metadata fields being provided to a user device as interactive programming guide signals;
to populate at least a portion of the first portal with the particular content item based on the detecting the specific field identifier;
to send an interactive programming guide configured to present a listing of channels, times, and programming and the one or more portals to a user; and
to receive a command from the user to access the first portal through the interactive programming guide.

19. The system of claim 18, wherein the media content server is further configured to provide a template of a portal over a network to a first content provider and to generate a portal related to a plurality of content items related to the first content provider based on one or more instructions provided by the first content provider through the network.

20. The system of claim 19, wherein the media content server is configured to organize the plurality of the content items into a plurality of folders, wherein each folder is associated with a content provider; and to provide access to the first content provider to a folder associated with the first content provider.

21. The system of claim 18, wherein the media content server is further configured to determine the plurality of content items related to the common topic of the first portal from the plurality of content items related to the plurality of topics.

22. A method comprising:
providing, by a computing device, a portal configured to present a plurality of content items related to a common topic, the plurality of content items including at least one on-demand content item and at least one scheduled content item;
automatically determining, by the computing device, that a particular content item matches the common topic of the portal by detecting a specific field identifier within metadata fields associated with the plurality of content items and that identify the particular content item as matching the common topic of the portal, the metadata fields being provided to a user device as interactive programming guide signals; and
populating, by the computing device, at least a portion of the portal with the particular content item based on the detecting the specific field identifier.

23. The method of claim 22 further comprising:
providing a template of the portal to a content provider associated with the common topic;
receiving one or more changes for the portal from the content provider through the template; and
updating the portal according to the one or more changes.

24. A method comprising:
providing, by a computing device, a template of a portal to a content provider over a network;
receiving, by the computing device, one or more instructions from the content provider through the template regarding the portal; and
maintaining, by the computing device, the portal according to the one or more instructions configured to present a plurality of content items related to a common topic of content provided by the content provider, the plurality of content items including at least one on-demand content item and at least one scheduled content item;
automatically determining, by the computing device, that a particular content item matches the common topic by detecting a specific field identifier within metadata fields associated with the plurality of content items and that identify the particular content item as matching the common topic, the metadata fields being provided to a user device as interactive programming guide signals; and
populating, by the computing device, at least a portion of the portal with the particular content item based on the detecting the specific field identifier.

25. The method of claim 24 further comprising providing an interactive programming guide configured to present a listing of channels, times, and programming and the portal related to the content provider.

* * * * *